July 21, 1959 B. C. BELLOWS, JR 2,896,176

DISTORTION CORRECTOR

Filed April 16, 1957

INVENTOR
B. C. BELLOWS JR.

BY Ralph T. Holcomb
ATTORNEY

United States Patent Office 2,896,176

Patented July 21, 1959

2,896,176

DISTORTION CORRECTOR

Brian C. Bellows, Jr., Brookside, N.J., assignor to Bell Telephone Laboratories, Incorporated, New York, N.Y., a corporation of New York Application April 16, 1957, Serial No. 653,175

4 Claims. (Cl. 333—28)

This invention relates to wave transmission networks and more particularly to distortion correctors of the transversal type providing adjustable gain and delay equalization.

The principal object of the invention is to correct for gain and delay deviations such as occur in broadband wave transmission systems. A more specific object is to provide either pure gain equalizaton or pure delay equalization. Another object is to proivde a series of harmonically related gain or delay shapes which may be adjusted individually to furnish any desired transmission characteristic. Further objects are to reduce the flat loss in an equalizer of this type and to reduce interaction between the shapes.

Some broadband wave transmission systems, such as certain radio relay systems, employ frequency modulation to transmit multichannel telephony or television. If the gain and envelope delay are not constant over the frequency band employed, non-linear distortion of the demodulated signal results. This causes distorted television images or cross modulation among the voice channels. Basic equalization is usually provided in each repeater and certain fixed equalizers are used on a mop-up basis, but some distortion remains. The distortion corrector or equalizer of the present invention provides a series of independently adjustable, cosine-shaped, harmonically related gain and delay characteristics which are well adapted for eliminating residual distortion of this type. With it, any gain or delay characteristic may be synthesized, limited only by the number and range of the harmonics.

The equalizer is of the transversal type, comprising a terminated delay line, a main transmission path coupled to the center of the delay line, and one or more pairs of echo paths. Each pair is coupled at one end to points on the line equidistant from the center, and at the other end to the main path. Directional couplers are used to effect part or all of these couplings. Each of the directional couplers has four ports, one of which is terminated in an impedance. The impedances associated with the couplers at one end of each of the echo paths are adjustable. Adjustment of these impedances determines the magnitude and the polarity of the signal voltages in the echo paths. If the voltages in a pair of echo paths are equal and of the same sign, a pure gain shape is obtained. If these voltages are equal but opposite in signa, an almost pure delay shape results. By proper adjustment, simultaneous gain and delay equalization may be provided. If the spacing between the echo paths is equal, the shapes corresponding to the different pairs of echoes will be harmonically related cosine characteristics when plotted against frequency. The employment of directional couplers reduces the flat loss of the equalizer and decreases the interaction between the shapes.

Figure 1:
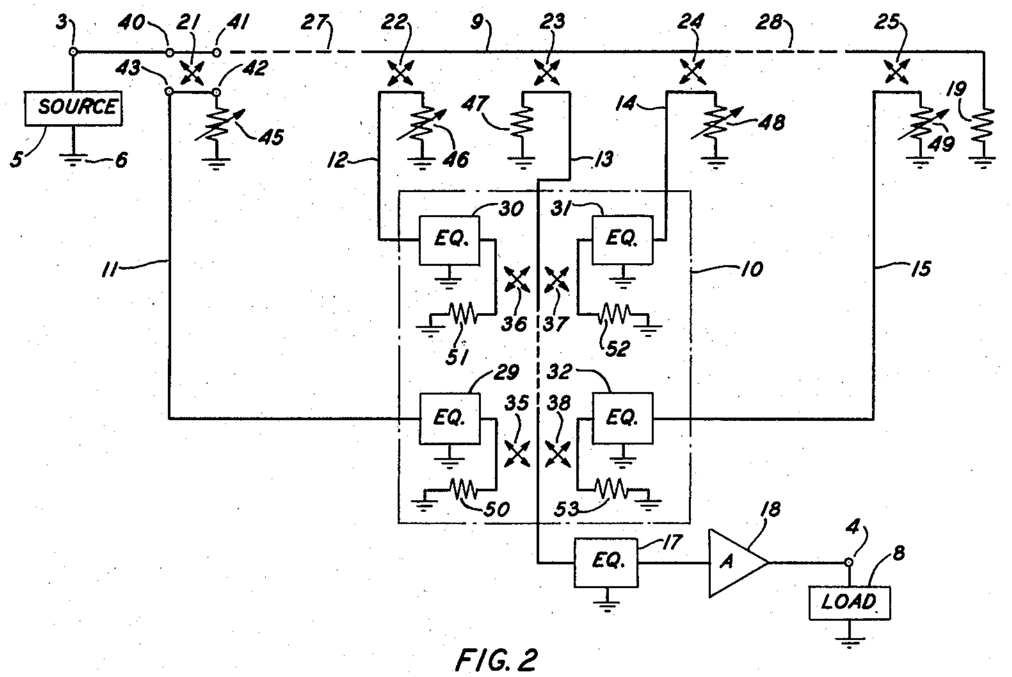
Figure 2:
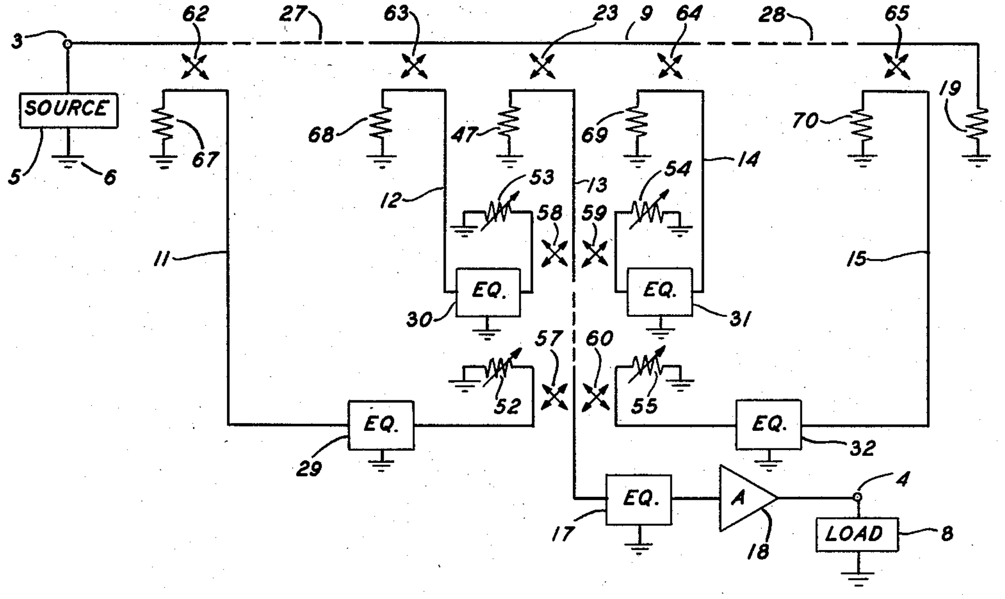

The nature of the invention and its various objects, features, and advantages will appear more fully in the following detailed description of the typical embodiments illustrated in the accompanying drawing, of which Fig. 1 is a schematic circuit showing an equalizer in accordance with the invention in which the voltages in the echo paths are controlled at the delay-line end; and Fig. 2 is a modified circuit in which these voltages are controlled at the summing end of the echo paths.

Fig. 1 shows an adjustable, two-term, gain or delay equalizer having two ports represented by the terminals 3 and 4. Either may be the input and either the output terminal. As shown, a source 5 of signals to be equalized is connected between the terminal 3 and ground 6 and a suitable load 8 between the terminal 4 and ground. The equalizer comprises a delay line 9, a combining network 10 shown within a broken-line box, five paths 11, 12, 13, 14, and 15 interconnecting the line 9 and the network 10, an equalizer 17, and an amplifier 18.

The delay line 9, which may have either distributed or lumped constants, is connected at one end to the input terminal 3 and is terminated at its other end in its characteristic impedance 19. The paths 11 through 15 are coupled at one end to the delay line 9 by means of the branching directional couplers 21 through 25, respectively, which have equal electrical spacings along the line 9.

The main path 13, coupled at one end to the center of the line 9, passes directly through the network 10 and, through the equalizer 17 and the amplifier 18, to the output terminal 4. The paths 11, 12, 14, and 15, equally spaced in pairs from the main path 13, are the echo paths. Thus, the paths 12 and 14 form a pair and the paths 11 and 15 a second pair. Any required number of additional pairs of echo paths may be added, as indicated by the broken portions 27 and 28 of the line 9. The paths 11, 12, 14, and 15 include the equalizers 29, 30, 31, and 32 and connect at their other ends to the main path 13 by means of the combining directional couplers 35, 36, 37, and 38, respectively.

Each of the branching directional couplers 21 through 25 and each of the combining directional couplers 35 through 38 has four ports, represented by the terminals 40, 41, 42, and 43 shown on the branching coupler 21. The branching coupler is inserted into the delay line 9 by means of the ports 40 and 41. The echo path 11 is connected to the port 43, and an adjustable impedance 45 between the terminal 42 and ground. The impedance 45 is adjustable from a value below to a value above the impedance seen looking into the port 42. Similar adjustable impedances 46, 48, and 49 are connected to the corresponding ports of the branching couplers 22, 24, and 25. Fixed matching impedances 50, 51, 52 and 53 are connected, respectively, to a port of each of the combining couplers 29 through 32. A fixed matching impedance 47 is connected to the port of the coupler 23 corresponding to the port 43, and the main path 13 is connected to the port corresponding to 42. A suitable directional coupler for use with a coaxial transmission line is disclosed in my Patent 2,679,632, issued May 25, 1954. Other types may, of course, be used.

Each of the equalizers corrects for the amplitude distortion of the signal caused by its passage through a directional coupler from the primary transmission line to the secondary line. Thus, the equalizers 29, 30, 31, and 32 compensate for the branching couplers 21, 22, 24, and 25. Since the outputs from the paths 11 through 15 are all summed in the combining network 10, the single equalizer 17 will correct for all of the couplers 23, 35, 36, 37, and 38.

The amplifier 18 may be included to overcome the flat loss in the equalizer, or to raise the energy level.

In building the equalizer, care must be taken to insure that the delay between the tapping point on the line 9 and the combining network 10 is the same for each of the paths 11 through 15 and that the parasitic losses, such as those in the cabling, are the same for each path.

A directional coupler has properties similar to a hybrid coil. Power entering one port divides, not necessarily equally, between two other ports but none of it reaches the fourth, or conjugate, port. In the branching coupler 21, the power entering the port 40 divides between the ports 41 and 42 but practically none appears at the port 43. The insertion loss of the branching couplers 21 through 25 in the line 9 is kept small by having nearly all the power entering at the port 40 come out at the port 41, while only a small fraction is diverted to the port 42. The power extracted from the line 9 by the coupler 23 goes directly to the main path 13.

The directional properties of the branching couplers 21, 22, 24, and 25 are used to control the magnitude and the polarity of the signals in the echo paths 11, 12, 14, and 15. A small portion of the input signal from the source 5 appears at the port 42 of the coupler 21, but none at the port 43. The impedance 45, if it exactly matches the impedance seen looking into the port 42, will absorb all of this signal. This impedance is made adjustable, as indicated by the arrow, so that it may be set at the matching value or at a higher or lower value. If the impedance 45 is not set at the matching value, it reflects a portion of the signal back into the port 42. Most of this reflected signal will come out of the port 43 and enter the echo path 11. Thus, the magnitude and sign of the voltage entering the path 11 may be controlled by adjusting the impedance 45. A small portion of the signal reflected by this impedance will emerge at the port 40, headed toward the input terminal 3. This portion can be neglected, since it will be attenuated by twice the coupling loss between the line 9 and the branch 11 plus the loss of the reflection at the port 42.

The impedances 46, 48, and 49 associated with the branching directional couplers 22, 24, and 25 may be adjusted in the same way to control the magnitude and sign of the signals entering the paths 12, 14, and 15.

The combining couplers 35 through 38 at the other ends of the echo paths are used to prevent interaction between the paths. For example, part of the signal from the path 11 which enters the combining coupler 35 is transferred to the main path 13 and propagates toward the output terminal 4, while the rest is dissipated in the matching termination 50. None is propagated in the path 13 toward the line 9.

As compared with the signal in the main path 13, the signals tapped off from the first half of the delay line 9 by the branching couplers 21 and 22 constitute leading echoes, while those tapped off by the branching couplers 24 and 25 in the second half are lagging echoes. Combinations of both types of echoes, either positive or negative as required, are added in the combining network 10 to cancel out distortion present in the input signal from the source 5. To obtain a family of cosine gain versus frequency characteristics without any appreciable delay characteristic, equal leading and lagging echoes of the same polarity are added to the main signal. One such term may be provided by adjusting the impedances 45 and 49 so that the signals entering the echo paths 11 and 15 are equal in magnitude and of the same sign. To obtain a corresponding family of cosine delay versus frequency characteristics without gain distortion, leading and lagging echoes equal in magnitude but of opposite polarity are added to the main signal. For example, the impedances 46 and 48 may be set so that the echoes from the paths 12 and 14 are equal but of opposite sign. Both gain and delay may be obtained from the same pair of echoes if they are adjusted for inequality. The circuit of Fig. 1 provides two gain terms and two delay terms. If more terms are required, more pairs of echo paths must be added.

The equalizer circuit of Fig. 2 is similar to the one shown in Fig. 1 except that the adjustable impedances 52, 53, 54, and 55 are associated with the combining directional couplers 57, 58, 59, and 60 connecting the echo paths 11, 12, 14, and 15 to the main path 13. The branching directional couplers 62, 63, 64, and 65 in the delay line 9 are terminated at one port in the matching impedances 67, 68, 69, and 70, respectively. Thus, the small portion of the input signal which is extracted from the line 9 by the branching coupler 62 enters the echo path 11 directly, and most of it appears at the port of the combining coupler 57 to which the impedance 52 is connected. The magnitude and polarity of the portion reflected back into the port depends upon the setting of the impedance 52. Part of the reflected signal is transferred to the main path 13 and propagates toward the output terminal 4. The echoes in the paths 12, 14, and 15 are adjusted in the same way. The equalizer may be adjusted to provide the same types of gain and delay characteristics as the circuit of Fig. 1.

It is to be understood that the above-described arrangements are only illustrative of the application of the principles of the invention. Numerous other arrangements may be devised by those skilled in the art without departing from the spirit and scope of the invention.

What is claimed is:

1. A device providing adjustable gain and delay equalization for correcting distortion on broadband wave transmission systems comprising in combination with a source of electrical signals, a terminated delay path connected at the free end to said source, a four-terminal directional coupler having two of said terminals connected to said delay path at the center thereof, a fixed matching impedance for controlling the directivity of said coupler connected to a third terminal, a main transmission path coupled to said delay path through the free terminal of said directional coupler and extending to an output circuit and a plurality of echo branches each coupled at one end to one of said paths by a four-terminal directional coupler having two of said terminals connected to said path and the remaining terminal connected to a variable impedance for providing said coupler with control of the magnitude and polarity of the signals passing through said coupler and coupled at the other end to the other of said paths, whereby electrical signals being applied to said delay path are coupled into said main path and said echo branches controlled as to magnitude and polarity by said directional couplers and recoupled to said main path, thereby equalizing the input signal as to gain and delay distortion.

2. A device providing adjustable gain and delay equalization for correcting distortion on broadband wave transmission systems comprising in combination with a source of electrical signals, a terminated delay path connected at the free end to said source, a four-terminal directional coupler having two of said terminals connected to said delay line at the electrical center thereof, a fixed matching impedance for controlling the directivity of said coupler connected to a third terminal, a main transmission path coupled to said delay path through the free terminal of said directional coupler and extending to an output circuit, a plurality of branching four-terminal directional couplers each connected by two of said terminals to said delay path at points symmetrically spaced with respect to said main path, a plurality of combining four-terminal directional couplers each connected by two of said terminals to said main path, a plurality of echo branches each containing a fixed gain equalizer and each coupled at one end to said delay path at one of said symmetrically spaced points through a third terminal of the branching directional coupler at that point and each coupled at the other end to said main path through a third terminal of a combining directional coupler, and impedances connected respectively to the remaining terminals of all branching and combining directional couplers, the impedance connected to at least one of the couplers associated with each echo branch being variable to provide said directional couplers with control of the coupled signals as to magnitude and polarity, whereby electrical signals being applied to said delay path are coupled into said main path and said echo branches, controlled as to magnitude and polarity by the variable impedance directional couplers and recoupled to said main path, thereby equalizing the input signal as to gain and delay distortion.

3. A device providing adjustable gain and delay equalization for correcting distortion on broadband wave transmission systems comprising in combination with a source of electrical signals, a terminated delay path connected at the free end to said source, a four-terminal directional coupler having two of said terminals connected to said delay path at the center thereof, a fixed matching impedance for controlling the directivity of said coupler connected to a third terminal, a main transmission path coupled to said delay path through the free terminal of said directional coupler and extending to a series output circuit consisting of a fixed gain equalizer, an amplifier and an output load, a plurality of branching four-terminal directional couplers each connected by two of said terminals to said delay path at points symmetrically spaced with respect to said main path and each having the third terminal connected to a variable impedance which can be adjusted to values above and below the matching impedance thereby controlling the magnitude and polarity of signals passing through each branching directional coupler, a plurality of combining four-terminal directional couplers each connected by two of said terminals to said main path and each having the third terminal connected to a fixed matching impedance for controlling the directivity of said coupler, and a plurality of echo branches each containing a fixed gain equalizer to compensate for any amplitude distortion caused by the insertion of a directional coupler and each coupled at one end to said delay path at one of said symmetrically spaced points through the remaining terminal of a branching directional coupler and each coupled at the other end to said main path through the remaining terminal of a combining directional coupler, whereby electrical signals being applied to said delay path are directionally coupled into said main path and said echo branches, controlled as to magnitude and polarity by the branching directional couplers and recoupled to said main path, thereby equalizing the input signal as to gain and delay distortion.

4. A device providing adjustable gain and delay equalization for correcting distortion on broadband wave transmission systems comprising in combination with a source of electrical signals, a terminated delay path connected at the free end to said source, a four-terminal directional coupler having two of said terminals connected to said delay path at the center thereof, a fixed matching impedance for controlling the directivity of said coupler connected to a third terminal, a main transmission path coupled to said delay path through the free terminal of said directional coupler and extending to a series output circuit consisting of a fixed gain equalizer, an amplifier and an output load, a plurality of branching four-terminal directional couplers each connected by two of said terminals to said delay path at points symmetrically spaced with respect to said main path and each having the terminal connected to a fixed impedance for controlling the directivity of each directional coupler, a plurality of combining four-terminal directional couplers connected by two of said terminals to said main path, variable impedances which can be adjusted to values above and below the matching impedance coupled to the third terminals of each of said combining directional couplers thereby controlling the polarity and magnitude of signals passing through each combining directional coupler, and a plurality of echo branches each containing a fixed gain equalizer to compensate for any amplitude distortion caused by the insertion of a directional coupler and each coupled at one end to said delay path at one of said symmetrically spaced points through the remaining terminal of a branching directional coupler and each coupled at the other end to said main path through the remaining terminal of a combining directional coupler, whereby electrical signals being applied to said delay path are coupled into said main path and said echo branches, controlled as to magnitude and polarity by the combining directional couplers and recoupled to said main path, thereby equalizing the input signal as to gain and delay distortion.

References Cited in the file of this patent

UNITED STATES PATENTS

| | | |
|---|---|---|
| 2,679,632 | Bellows | May 25, 1954 |
| 2,759,044 | Oliver | Aug. 14, 1956 |
| 2,760,164 | Graham et al. | Aug. 21, 1956 |